US009501161B2

(12) United States Patent
Yasui

(10) Patent No.: US 9,501,161 B2
(45) Date of Patent: Nov. 22, 2016

(54) USER INTERFACE FOR FACILITATING CHARACTER INPUT

(75) Inventor: Nozomu Yasui, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 13/811,491

(22) PCT Filed: Oct. 22, 2010

(86) PCT No.: PCT/US2010/053850
§ 371 (c)(1),
(2), (4) Date: Jan. 22, 2013

(87) PCT Pub. No.: WO2012/054062
PCT Pub. Date: Apr. 26, 2012

(65) Prior Publication Data
US 2013/0120305 A1    May 16, 2013

(51) Int. Cl.
G06F 3/041    (2006.01)
G06F 3/023    (2006.01)
G06F 3/0488   (2013.01)

(52) U.S. Cl.
CPC ............. *G06F 3/041* (2013.01); *G06F 3/0237* (2013.01); *G06F 3/04883* (2013.01)

(58) Field of Classification Search
None
See application file for complete search history.

(56) References Cited

U.S. PATENT DOCUMENTS

| 5,555,363 | A * | 9/1996 | Tou et al. ..................... 715/205 |
| 6,295,372 | B1 | 9/2001 | Hawkins et al. |
| 7,508,380 | B2 | 3/2009 | Chung |
| 2006/0092128 | A1 | 5/2006 | Gao et al. |
| 2006/0230347 | A1 | 10/2006 | Han |
| 2007/0046641 | A1 * | 3/2007 | Lim .............................. 345/173 |
| 2009/0322692 | A1 * | 12/2009 | Kim et al. ..................... 345/173 |
| 2010/0060585 | A1 | 3/2010 | Chiu |
| 2010/0164897 | A1 | 7/2010 | Morin et al. |

FOREIGN PATENT DOCUMENTS

KR    10-2009-0114054 A    11/2009
KR    10-2010-0042998 A    4/2010

OTHER PUBLICATIONS

Newton, Thomas; "Nuance T9 Write: Multi-Touch Touchscreen Handwriting"; Feb. 15, 2010; 2 pages.
PCT; "Notification of Transmittal of the International Search Report and the Written Opinion of the International Searching Authority, or the Declaration"; for PCT/US2010/053850 mailed Aug. 2, 2011; 9 pages.
http://www.exideas.com/ME/ProductsMEOK.html, "MessagEase Onscreen Keyboard" dated at least as early as Aug. 14, 2010 (3 pages).
SiteKiosk 7 public access terminal software, Documentation, "Touch Screen Onscreen Keyboard" dated at least as early as Jul. 21, 2010 (3 pages).

* cited by examiner

*Primary Examiner* — Christopher R Lamb
(74) *Attorney, Agent, or Firm* — Trop, Pruner & Hu

(57) ABSTRACT

Embodiments of the present invention disclose a user interface for facilitating touch input. According to one example, a single desired character is determined upon a touch input being received within at least one area of the user interface. The desired character is appended to an input word string. Furthermore, the input word string and a single desired character are displayed in distinct adjacent areas on the user interface.

16 Claims, 4 Drawing Sheets

USER INTERFACE FOR FACILITATING CHARACTER INPUT

CROSS-REFERENCE TO RELATED APPLICATION

This application is a national stage application under 35 U.S.C. §371 of PCT/US2010/053850, filed Oct. 22, 2010.

BACKGROUND

The emergence and popularity of mobile computing has made portable electronic devices, due to theft compact design and light weight, a staple in today's marketplace. In addition, many of these portable electronic devices include a touchscreen display device configured to detect the location and presence of a user's desired touch input. For example, a user's finger or a passive object, such as a stylus, may come into physical contact with the touchscreen display so as to register as an input at said location. Furthermore, some portable electronic devices include an on-screen virtual keyboard for enabling character input on the touchscreen display by the user.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Computing devices which lack physical keyboard such as some tablet personal computers and handheld devices, are inefficient and cumbersome for rapid character input. The virtual keyboard generally occupies most (i.e. more than half) of the display screen via the full graphical layout of the QWERTY keyboard. As such, the viewable area not including the virtual keyboard is reduced so as to cause an inconvenience to the user. Still further, the long distance between some characters on the virtual keyboard (e.g. characters "a" and "p") serves to increase the length of time for multiple character input during one-hand use of the portable computing device. Accordingly, there is a need in the art for a more robust and useful character input method.

Embodiments in accordance with the present invention provide an improved user interface for facilitating character input on a computing device. According to one example, the user interface is represented as a small square-shaped graphical interface configured to capture all alphanumeric character input without the use of a standard keyboard, physical or virtual. In addition, the user interface provides a list of predicted words for user selection prior to the user completing character input for the desired word.

Figure 1A:
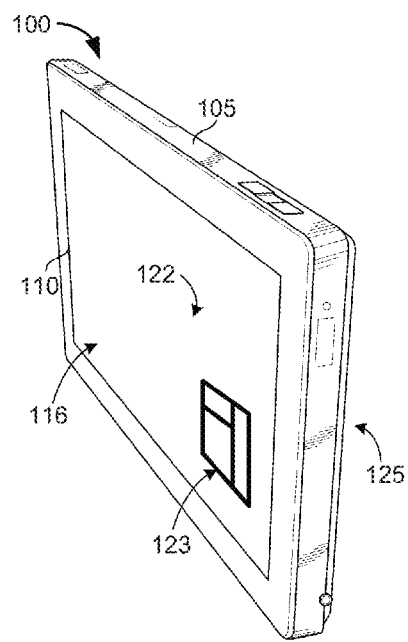
FIGS. 1A-1C are three-dimensional perspective views of a computing device implementing the user interface according to an example of the present invention.
Figure 1B:
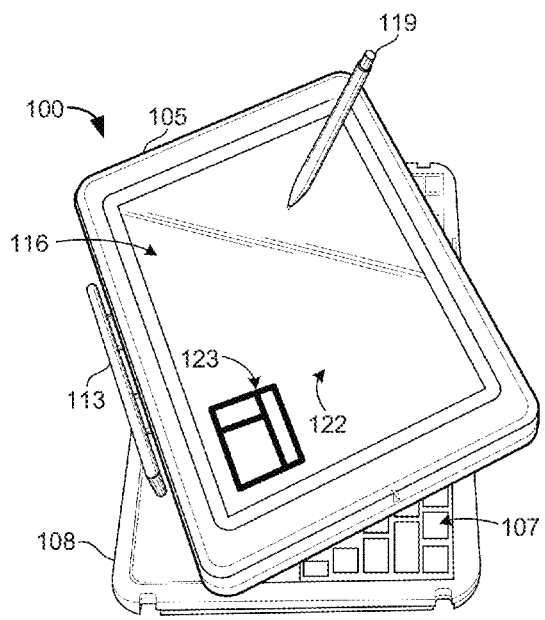
Figure 1C:
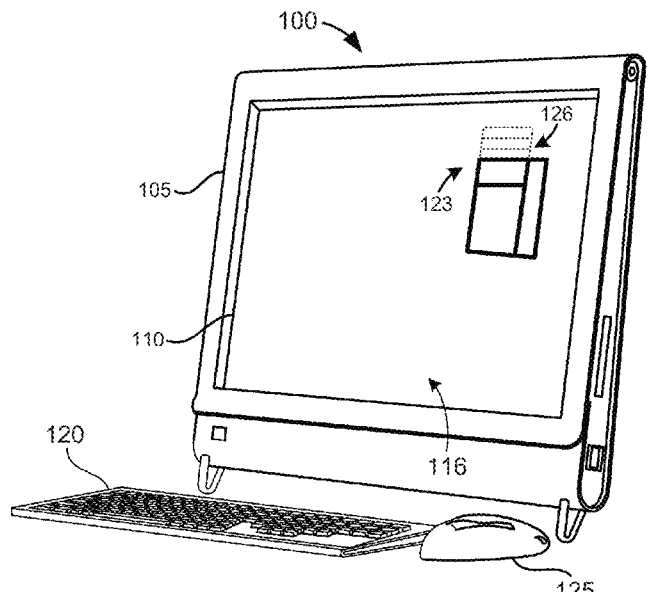

Referring now in more detail to the drawings in which like numerals identify corresponding parts throughout the views, FIGS. 1A-1C are a three-dimensional perspective views of a computing device implement the user interlace according to an example of the present invention. As shown in FIG. 1A, a computing device 100 includes a housing 105 for accommodating a display unit 110. Here, the computing device 100 is represented as a tablet personal computer. The display unit 110 includes a touch-enabled surface 116 configured to display a graphical user interface 123 for facilitating character input. The touch-enabled display unit 110 includes electrical wiring adapted to provide graphical display to a user on a contact surface side 116. As shown, the background viewing area 122, or the area not encumbered or blocked by the graphical user interface 123, is substantial and much larger than the area that would be available if a full virtual keyboard was utilized. Similarly, FIG. 1B depicts a convertible laptop computer as the computing device in accordance with an example of the present invention. In particular, the computing device 100 includes a base housing 108 having an input means such as a physical keyboard 107, and a display housing 105 for encompassing a touch-enabled display unit 110. Moreover, a stylus 119 may be used as an input device for physically contacting a touch surface 116 or the user interface 123 of the display unit 110. Again, the remaining viewable area 122 not obstructed by the user interface 123 is large enough for the user to visualize and interact with other background objects showing on the display unit 110. In the present example, the display housing 105 is configured to rotate and fold downward from an upright position with respect to the base housing 108 via a hinge pivot assembly 113.

FIG. 1C depicts another computing device incorporating the graphical user interface in accordance with an example of the present invention. As shown here, the computing device 100 is represented as an all-in-one personal computer. As in the previous embodiment, the computing device 100 includes a housing 105 for accommodating a display unit 105. In addition, the computing device includes alternate input mechanisms such as a keyboard 120 and a mouse 125. The display unit includes a touch surface 116 configured to display the user interface 123 of the present example. Here, the user interface is also configured to display a pop-up word predictor area 126 that displays a list of candidate words for selection by the user. As shown in these examples, the user interface 123 may be positioned in any area (i.e. center, bottom left, bottom left) of the touch-enabled surface of the display unit 110.

Figure 2:
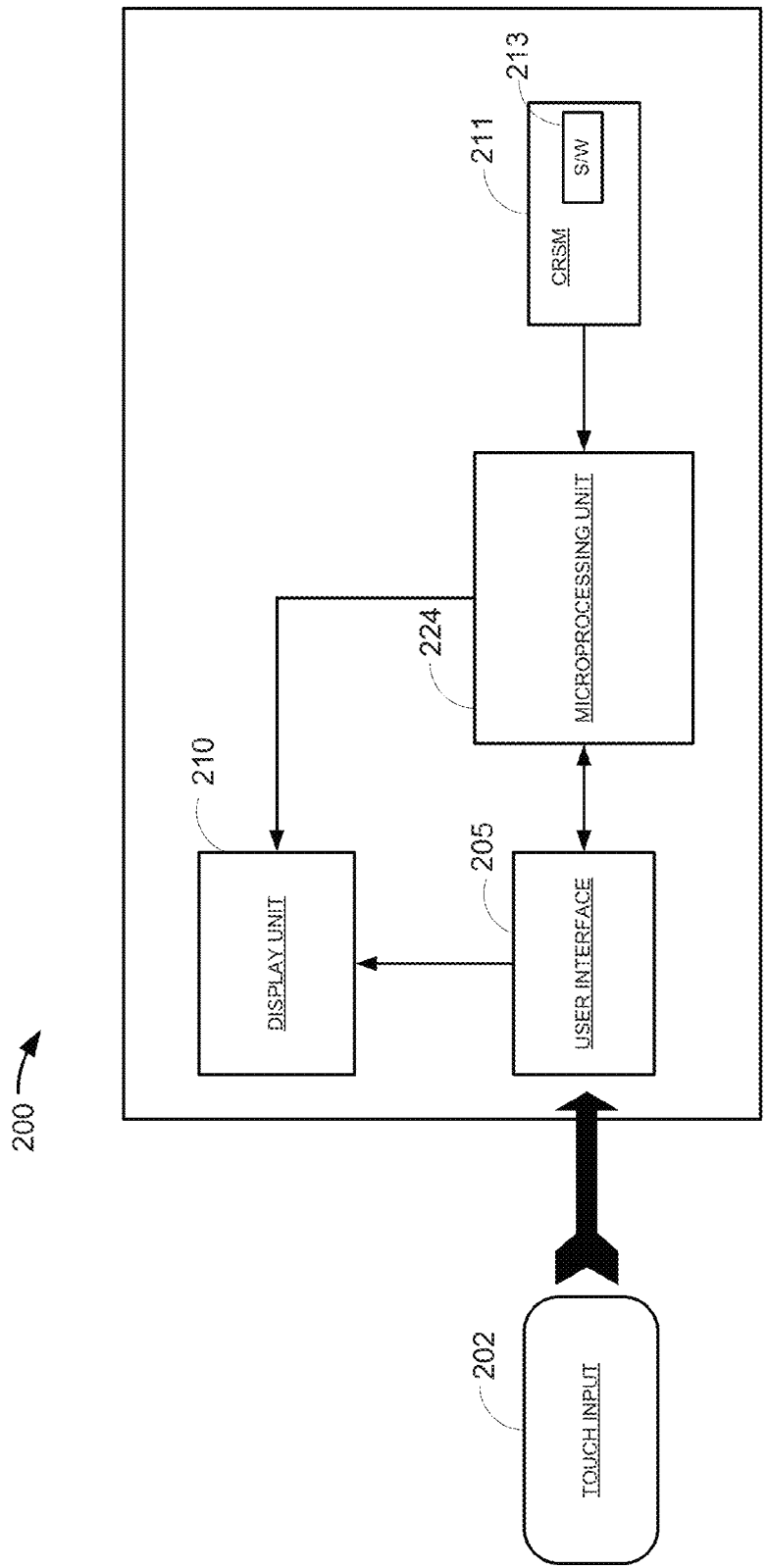
FIG. 2 is a simplified block diagram of the computing device incorporating the user interface according to an example of the present invention.

FIG. 2 is a simplified block diagram of the computing device incorporating the user interface according to an example of the present invention. As shown in this example, the system 200 includes a processing unit 224 coupled to a display unit 210, a graphical user interface 205, and a computer-readable storage medium 211. The processor 224 represents a central processing unit configured to execute program instructions. Display unit 210 represents an electronic visual display or touch-sensitive display configured to display images and the graphical user interface 205 for enabling interaction between the user and the computing system 200. More particularly, the user interface 205 is configured to accept touch input 202 from a user for facilitating entry of alphanumeric character into the computing system 200. According to one example, the alphanumeric characters input by the user may include set of numbers 0 to 9 and letters from A to Z. In addition, the user interface 205 of the present example may accept symbols, punctuation marks, or the like. Storage medium 211 represents volatile storage (e.g. random access memory), non-volatile store (e.g. hard disk drive, read-only memory, compact disc read only memory, flash storage, etc.), or combinations thereof. Furthermore, storage medium 211 includes software 213 that is executable by the processing unit 224 and, that when executed, causes the processing unit 224 to perform some or all of the functionality described herein.

Figure 3:
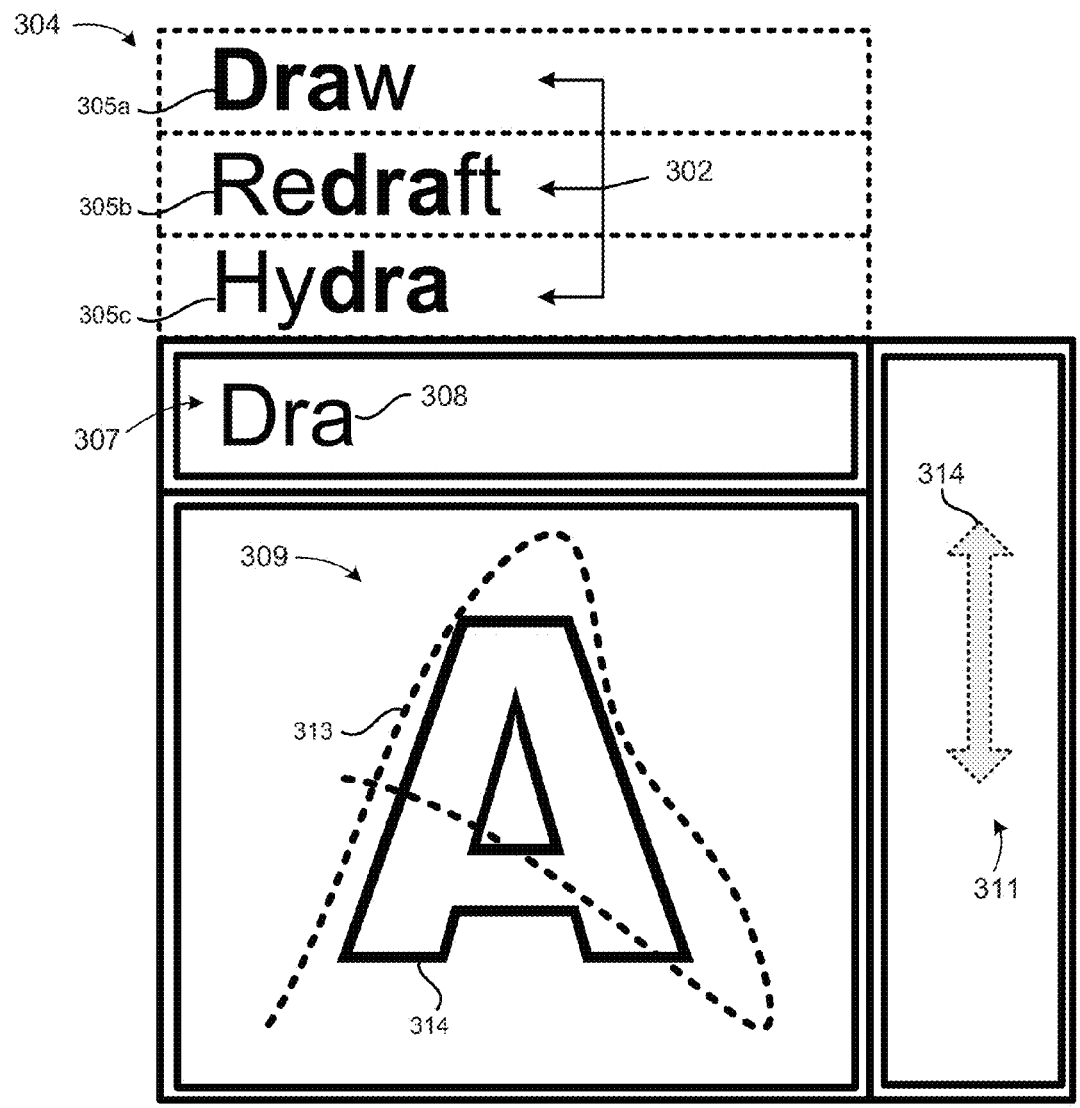
FIG. 3 is a graphical illustration of the user interface according to an example of the present invention.

FIG. 3 is a graphical illustration of the user interface according to an example of the present invention. Examples of the present invention define four separate and distinct areas in the user interface for facilitating character input—word input display area 307, character input area 309, touch input area 311, and word predictor area 304. According one example, a word input display area 307 is configured to display the string of characters that have been input from user. The character input area 309 is configured to display a single character which is to be input or appended to other characters currently displayed in the word display area 307. As shown in the present example, the desired character "A" is input and appended to the character string "Dr" to form a new character string "Dra" within the word display area 307. Still further, the character input area 309 may be further configured to accept drawing input from a user for a particular character. For instance, the user may draw the letter "A" as indicated by the drawing pattern 313 and have the letter "A" displayed within the character input area 309. According to one example embodiment, the character input area may also recognize gesture input from user using multiple touching points. For example, upward movement of two touching points (e.g. fingers) in the character display area 309 may cause the displayed character to change to an uppercase character, and similarly, downward movement of two touch points may cause the displayed character to change to a lowercase character. Still further, horizontal movement of multiple touch points in the character display area may create a backspace or keyboard space (i.e. blank character) input.

The touch input area 311 represents a vertical touching area configured to recognize vertical touch movement (indicated by arrow 314) from a user via physical contact or from a digitizer pen, stylus, mouse drag, or the like. According to one example, vertical touch movement within the touch input area 311 will cause the character displayed in the character input area 309 to change based on the particular touch input. For example, upward movement may cause the displayed character to change to the next sequential character, while downward movement may cause the displayed character to change to the previous character. Furthermore, a word predictor area 304 is configured to display a candidate word list 302 capable of selection by the user based on the word 308 currently displayed in the word input display area 307. Still further, the word predictor area is configured to display only after at least two desired characters have been input into the user interface and shown in the word input display area 307. Upon receiving at least two desired characters, the candidate word list 302 "pops up" above the word input display area 307 and includes at least one word for selection by the user. Though the word predictor area 304 is shown as above the word input display area, the word predictor area may also appear below the character input area 309 or any other area within the proximity of the user interface. As shown in the present example, the candidate word list 302 of predictor area may include words that match the currently displayed word 308 at the beginning of the candidate or predicted word (work 305*a*), the middle of the predicted word (word 305*b*), or at the end of the predicted word (word 305*c*).

Figure 4:
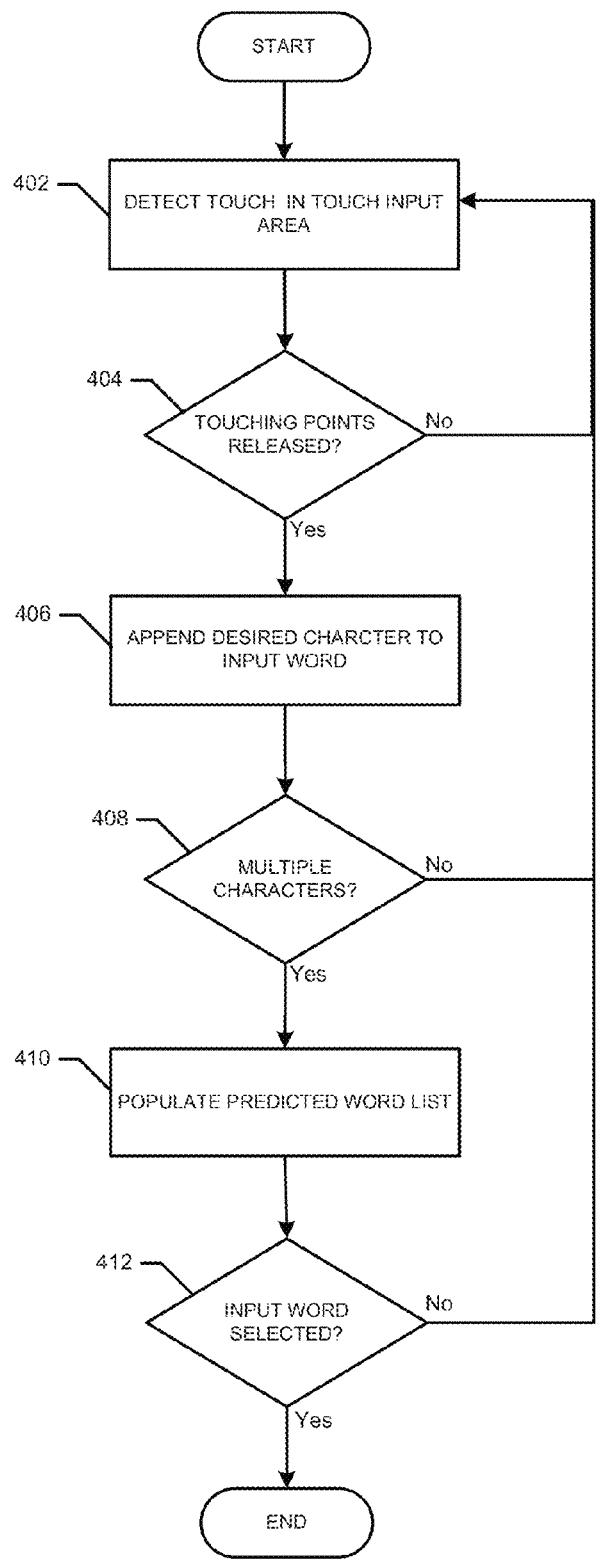
FIG. 4 is a flow chart of the processing steps for facilitating character input on the user interface in accordance with an example of the present invention.

FIG. 4 is a flow chart of the processing steps for facilitating character input on the user interface in accordance with an example of the present invention. In step 402, a touch input is received in either the touch input area or the character display area from a user for entering a desired alphanumeric character. If a vertical touch movement is detected in the touch input area via a digitizer pen, stylus, or mouse drag, the character displayed in the character display area is manipulated. For example, an upward touch movement may cause the displayed character to change to the previous character, or a downward touch movement may cause the displayed character to change to the next character. That is, if the displayed character is "B", an upward touch movement may change the displayed character to "A" (−1), and a downward touch movement may change the displayed character to "C" (+1). However, this process is simply one example as these actions may also be reversed (i.e. downward movement for previous character and upward movement for next character). In addition, vertical touch movement may also enable a continuous scrolling action through all the available characters. If the physical touch is a drawing input within the character input area, then the processing unit enters the displayed character into the character input area after the drawing pattern is analyzed and recognized as a character. Such character identification and analysis may be accomplished via character recognition software running on the processing unit. In each case, upon releasing the touch input (i.e. drawing or gesture input), the displayed character is registered by the processing unit as the desired character and appended to the word or character string displayed in the word input area in step 406. Next, in step 408, the processing unit determines if multiple characters, or at least two characters, have been entered by the user and included in the word input area. If so, then in step 410, a word predictor area appears above the input word area and the processing unit populates the word predictor area with a list of candidate words for selection by the user prior to the completing input of the desired word. On the other hand, if less than two characters have been entered, then the candidate list does not populate and the word predictor area does not appear thus leaving only three input areas displayed on the user interface.

Examples of the present invention provide a simplified and efficient one handed character input solution for computing devices. In addition, many other advantages are afforded by the user interface of the present examples. For instance, the graphical user interface represents a much smaller area of the display screen than a traditional virtual keyboard, thereby providing a much larger viewable area on the remainder of the display screen. Still further, since the list of candidate words are automatically provided on the user interface, the user does not need to spell check the candidate words. Similarly, the candidate word list of the user interface may offer the user assistance in the proper spelling of a particular word.

Furthermore, while the invention has been described with respect to exemplary embodiments, one skilled in the art will recognize that numerous modifications are possible. For example, although embodiments depict as several computing environments and computing devices, the invention is not limited thereto. For example, the user interface of the present examples may operate on a netbook computer, a smartphone, a projector screen, or any other environment utilized for touch-based interaction.

Furthermore, the arrangement and size of the four areas of the user interface may vary based on the configuration or size of the display unit. For example, the touch input area may appear on the left side of the character input area for left-handed users, and the input word area may appear below the character input area as opposed to above as depicted in the figures. Thus, although the invention has been described with respect to exemplary embodiments, it will be appreciated that the invention is intended to cover all modifications and equivalents within the scope of the following claims.

What is claimed is:

1. A method for facilitating input on a touch-enabled device, the method comprising:
   receiving a touch drawing input within at least one area of a graphical user interface displayed on the device;
   determining a given character corresponding to the received touch drawing input;
   displaying the given character in a first area of the graphical user interface;
   receiving a touch gesture input in the graphical user interface;
   in response to the touch gesture input, manipulating the given character displayed in the first area, to form a different target character, wherein the manipulating comprises:
      changing the given character to a next character sequentially following the given character, in response to the touch gesture input being along a first direction, and
      changing the given character to a previous character sequentially before the given character, in response to the touch gesture input being along a second direction different from the first direction;
   displaying the target character in the first area of the graphical user interface;
   appending the target character to an input word string; and
   displaying the input word string in a second area adjacent to the first area of the graphical user interface, wherein the first area is separate and distinct from the second area.

2. The method of claim 1, further comprising:
   predicting at least one word based on the input word string;
   selectively displaying the predicted at least one word in a third area adjacent to the first area of the graphical user interface,
   wherein the predicted at least one word is displayed after multiple characters have been input by the user.

3. The method of claim 2, further comprising:
   analyzing the touch drawing input received in the first area to determine the given character.

4. The method of claim 2, wherein the touch gesture input is received within a fourth area of the graphical user interface.

5. The method of claim 2, wherein the predicted at least one word is displayed in the third area prior to the user completing entry of all characters for a target word.

6. The method of claim 5, wherein the third area includes a plurality of predicted words predicted based on the input word string.

7. The method of claim 1, wherein the touch drawing input is received without a virtual keyboard in the graphical user interface.

8. The method of claim 1, wherein the manipulating comprises:
   changing the given character to an upper case character in response to a second touch gesture input being along the first direction, and
   changing the given character to a lower case character in response to the second touch gesture input being along the second direction different from the first direction.

9. A computing device comprising:
   a processor;
   a display unit coupled to the processor and to display a graphical user interface, wherein the graphical user interface comprises:
      a touch input area to receive a touch drawing input from a user;
      a character display area adjacent to the touch input area and to display a given character corresponding to the received touch drawing input;
      a word display area adjacent to the character display area and to display a string of characters input by the user,
      wherein the character display area is separate and distinct from the touch input area and the word display area, and
   the processor is to:
      detect a touch gesture input in the graphical user interface, and
      in response to the touch gesture input, manipulate the given character displayed in the character display area, to form a different target character, and cause display of the target character in the character display area, wherein the string of characters include the target character, wherein the manipulating comprises:
         changing the given character to a next character sequentially following the given character, in response to the touch gesture input being along a first direction, and
         changing the given character to a previous character sequentially before the given character, in response to the touch gesture input being along a second direction different from the first direction.

10. The computing device of claim 9, wherein the graphical user interface further comprises:
    a word predictor area adjacent to the character display area and to display at least one predicted word in response to receiving user input of at least two characters.

11. The computing device of claim 9, wherein the processor is to analyze the touch drawing input to determine the given character.

12. The computing device of claim 9, wherein the touch drawing input and the touch gesture input are received without a virtual keyboard in the graphical user interface.

13. The computing device of claim 9, wherein the manipulating comprises:
    changing the given character to an upper case character in response to a second touch gesture input being along the first direction, and changing the given character to a lower case character in response to the second touch gesture input being along the second direction different from the first direction.

14. A non-transitory computer readable storage medium storing executable instructions, which when executed by a processor, cause the processor to:
  receive a touch drawing input in at least one area of a graphical user interface displayed on a portable electronic device;
  display a given character, corresponding to the touch drawing input, in a first area of the graphical user interface;
  receive a touch gesture input in the graphical user interface, and
  in response to the touch gesture input, manipulate the given character displayed in the first area, to form a different target character, wherein the manipulating comprises:
    changing the given character to a next character sequentially following the given character, in response to the touch gesture input being along a first direction, and
    changing the given character to a previous character sequentially before the given character, in response to the touch gesture input being along a second direction different from the first direction;
  append the target character to a word string, wherein the word string is displayed in a second area of the graphical user interface;
  predict at least one word based on the word string; and
  display the predicted at least one word in a third area adjacent to the second area of the graphical user interface,
  wherein the first area is separate and distinct from the second area and the third area.

15. The non-transitory computer readable storage medium of claim 14, wherein the receiving of the touch drawing input and the touch gesture input is performed without using a virtual keyboard in the graphical user interface.

16. The non-transitory computer readable storage medium of claim 14, wherein the manipulating comprises:
  changing the given character to an upper case character in response to a second touch gesture input being along the first direction, and
  changing the given character to a lower case character in response to the second touch gesture input being along the second direction different from the first direction.

* * * * *